(12) United States Patent
Sakai et al.

(10) Patent No.: US 9,003,119 B2
(45) Date of Patent: Apr. 7, 2015

(54) CONTROL APPARATUS AND METHOD, AND STORAGE APPARATUS

(75) Inventors: Motohiro Sakai, Kawasaki (JP); Akihito Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 312 days.

(21) Appl. No.: 13/345,986

(22) Filed: Jan. 9, 2012

(65) Prior Publication Data
US 2012/0239882 A1 Sep. 20, 2012

(30) Foreign Application Priority Data
Mar. 18, 2011 (JP) .................. 2011-061162

(51) Int. Cl.
G06F 12/00 (2006.01)
G06F 3/06 (2006.01)

(52) U.S. Cl.
CPC ............ *G06F 3/0611* (2013.01); *G06F 3/0689* (2013.01); *G06F 3/0659* (2013.01)

(58) Field of Classification Search
USPC ......................................... 711/118, 154, 171
See application file for complete search history.

(56) References Cited

U.S. PATENT DOCUMENTS

| 7,548,982 | B2 * | 6/2009 | Gu et al. ................ 709/228 |
| 7,716,332 | B1 * | 5/2010 | Topfl et al. ............. 709/226 |
| 8,108,644 | B2 * | 1/2012 | Innan et al. ............. 711/170 |
| 8,504,411 | B1 * | 8/2013 | Subasic et al. .......... 705/7.33 |
| 8,676,741 | B2 * | 3/2014 | Ulinski et al. ............ 706/52 |
| 8,694,563 | B1 * | 4/2014 | Cameron et al. ......... 707/822 |
| 2004/0128618 | A1 * | 7/2004 | Datta ................... 715/513 |
| 2008/0288863 | A1 * | 11/2008 | Bohannon ............. 715/255 |
| 2009/0300301 | A1 * | 12/2009 | Vaghani ............... 711/162 |
| 2012/0226860 | A1 * | 9/2012 | Saito et al. ............ 711/118 |
| 2012/0303926 | A1 | 11/2012 | Ohira et al. |

FOREIGN PATENT DOCUMENTS

| JP | 1-224851 A | 9/1989 |
| JP | 2-176951 A | 7/1990 |
| JP | 2-39253 A | 8/1990 |
| JP | 7-121308 A | 5/1995 |
| JP | 2000-020398 A | 1/2000 |

(Continued)

OTHER PUBLICATIONS

Japanese Office Action mailed Jul. 29, 2014 for corresponding Japanese Patent Application No. 2011-061162, with Partial English Translation, 6 pages.

*Primary Examiner* — Arpan P. Savla
*Assistant Examiner* — Mohamed Gebril
(74) *Attorney, Agent, or Firm* — Fujitsu Patent Center

(57) ABSTRACT

In a storage apparatus, in the case where a data block to be written to a storage medium is a zero data block containing only zero data, a zero data information memory stores zero data identification information indicating that the data block is a zero data block. A control apparatus receives a data block from an access requesting apparatus in association with a write request issued by the access requesting apparatus for writing the data block a specified number of times to a predetermined storage area of the storage medium, and when determining that the data block is a zero data block containing only zero data, sets zero data identification information in the zero data information memory, and when completing the setting of the zero data identification information, sends the access requesting apparatus a completion notice of the writing to the storage medium.

10 Claims, 15 Drawing Sheets

(56) References Cited

FOREIGN PATENT DOCUMENTS

| JP | 2005-135116 A | 5/2005 |
| JP | 2009-181148 A | 8/2009 |
| WO | 2011/010344 A1 | 1/2011 |

\* cited by examiner

CONTROL APPARATUS AND METHOD, AND STORAGE APPARATUS

CROSS-REFERENCE TO RELATED APPLICATION

This application is based upon and claims the benefit of priority of the prior Japanese Patent Application No. 2011-061162, filed on Mar. 18, 2011, the entire contents of which are incorporated herein by reference.

FIELD

The embodiments discussed herein relate to a control apparatus and method, and a storage apparatus.

BACKGROUND

In recent years, a storage system provided with a plurality of storage devices is widely used to store a large volume of data treated in a computer system. As an example, there is a storage system that is provided with one or a plurality of storage media and a control device which controls data read and write on these storage media. For this control device, there is a known data control method in which data transmitted from a host device is stored in a buffer memory once and then the data is transferred from the buffer memory to a storage medium. This data control method requires a longer processing time to write data from the buffer memory to the storage medium than to receive and store the data from the host device to the buffer memory. To deal with this, there is a known technique of transmitting an interruption signal to the host device when the data transmission from the host device to the control device is completed so as to allow the host device to transmit next data. For example, please refer to Japanese Laid-Open Patent Publication No. 2000-20398.

The host device issues write commands, one type of which is a command to write a data block transmitted from the host device a specified number of times (WRITE SAME command). The control device that receives such a WRITE SAME command performs a process of writing the data block received from the host device, to a buffer memory one by one a specified number of times.

This data control method, however, has a drawback that it takes time to complete the writing because actual data is written to the buffer memory and this causes a delay in giving a response to the host device.

SUMMARY

According to an aspect, there is provided a control apparatus for controlling data access to a storage medium. The control apparatus includes: a memory configured to store zero data identification information in a case where a data block to be written to the storage medium is a zero data block containing only zero data, the zero data identification information indicating that the data block is a zero data block; and one or more processors configured to perform a procedure comprising receiving the data block from an access requesting apparatus in association with a write request issued by the access requesting apparatus for writing the data block a specified number of times to a specified storage area of the storage medium, and when determining that the data block is a zero data block containing only zero data, sets the zero data identification information in the memory, and when completing the setting of the zero data identification information, sends the access requesting apparatus a completion notice of the writing to the storage medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
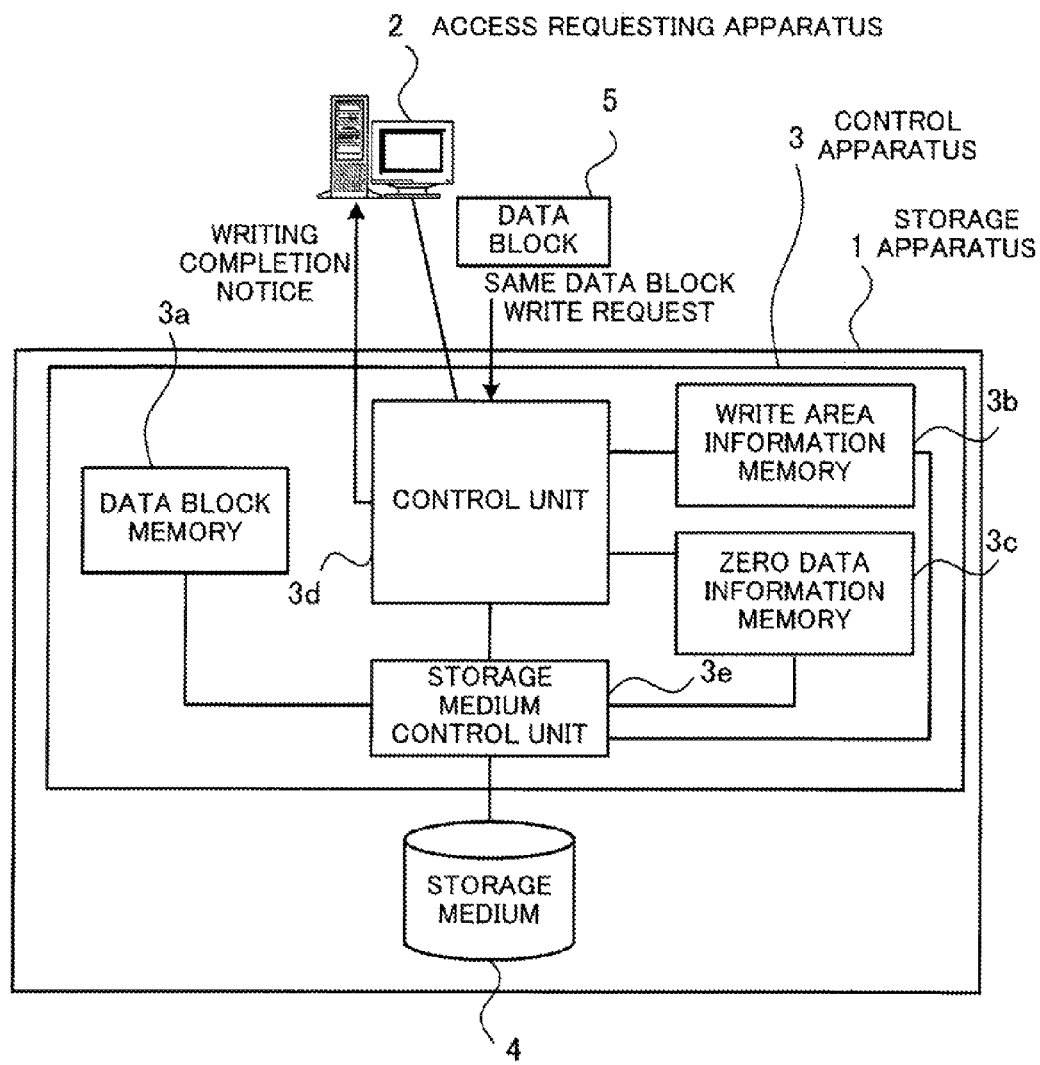
FIG. 1 illustrates a storage apparatus according to a first embodiment.

Several embodiments will be described below with reference to the accompanying drawings, wherein like reference numerals refer to like elements throughout. The following first describes a disclosed storage apparatus according to a first embodiment, and then describes the disclosed storage apparatus more concretely.

(First Embodiment)

FIG. 1 illustrates a storage apparatus according to the first embodiment.

The illustrated storage apparatus 1 is connected to an access requesting apparatus 2 via a line such as a telecommunications line or optical communications line.

The storage apparatus 1 includes a control apparatus 3 and a storage medium 4. The storage medium 4 has a storage area for storing data. For example, a Hard Disk Drive (HDD) or Solid State Drive (SSD) may be used as this storage medium 4. The illustrated storage apparatus 1 includes one storage medium 4, but may be provided with two or more storage media.

For example, the access requesting apparatus 2 transmits, to the control apparatus 3, a write request (hereinafter, referred to as same data block write request) for writing a data block 5 a specified number of times to a specified storage area of the storage medium 4, as illustrated in FIG. 1. After transmitting this same data block write request, the access requesting apparatus 2 transmits the data block 5 to the control apparatus 3.

The control apparatus 3 receives the write request from the access requesting apparatus 2, and controls the requested writing of the data block 5 to the storage medium 4. This control apparatus 3 includes a data block memory 3a, write area information memory 3b, zero data information memory 3c, control unit 3d, and storage medium control unit 3e. The data block memory 3a, write area information memory 3b, and zero data information memory 3c are implemented in the memory area of a cache memory provided in the control apparatus 3. The control unit 3d and storage medium control unit 3e are realized as functions of a Central Processing Unit (CPU) provided in the control apparatus 3.

The data block memory 3a is a memory area that temporarily stores the data block 5 to be written to the storage medium 4.

The write area information memory 3b stores write area identification information indicating a write area of the storage medium 4 where the data block 5 is written according to the same data block write request. As an example, a bitmap is used as this write area identification information.

The zero data information memory 3c stores zero data identification information indicating that the data block 5 is a zero data block containing only zero data in the case where the data block 5 contains only data with zero-value bits. As an example, a flag may be used as this zero data identification information.

When receiving the same data block write request from the access requesting apparatus 2, the control unit 3d sets write area identification information according to the same data block write request in the write area information memory 3b.

When receiving the data block 5, which comes after the same data block write request, from the access requesting apparatus 2, the control unit 3d determines whether or not the data block 5 is a zero data block containing only zero data. If the data block 5 is a zero data block, the control unit 3d sets zero data identification information in the zero data information memory 3c. When completing the setting of the zero data identification information, the control unit 3d sends the access requesting apparatus 2 a completion notice of the writing to the storage medium 4. Then, the control unit 3d instructs the storage medium control unit 3e to write the zero data to the storage area of the storage medium 4.

According to the first embodiment, in the case where the data block 5 is a zero data block containing only zero data, the control apparatus 3 sends the access requesting apparatus 2 a completion notice of the writing to the storage medium 4 when setting a flag in the zero data information memory 3c. This means that the control apparatus 3 is able to reduce the time to give a response to the access requesting apparatus 2, as compared with the case of giving such a completion notice after writing the received zero data block in the data block memory 3a.

In addition, the control apparatus 3 has the write area information memory 3b so that the control unit 3d stores write area identification information according to a same data block write request. This enables the control apparatus 3 to determine where in the storage medium 4 the data block is to be written according to the same data block write request.

In the case where the data block 5 is a non-zero data block containing non-zero data, on the other hand, the control unit 3d writes the data block 5 at the beginning of a write area of the data block memory 3a secured corresponding to the write area identification information stored in the write area information memory 3b.

The storage medium control unit 3e receives an instruction from the control unit 3d, and writes the data block 5 to the storage medium 4. More specifically, the storage medium control unit 3e determines whether zero data identification information is set in the zero data information memory 3c.

If determining that the zero data identification information is set, the storage medium control unit 3e produces as many copies of the zero data block 5 as specified by the same data block write request. Then, the storage medium control unit 3e writes the copies of the zero data block 5 to the storage area of the storage medium 4 indicated by the write area identification information stored in the write area information memory 3b. If determining that the zero data identification information is not set, on the contrary, the storage medium control unit 3e produces as many copies of the data block 5 stored at the beginning of the write area of the data block memory 3a as specified by the same data block write request, with reference to the write area identification information stored in the write area information memory 3b. Then, the storage medium control unit 3e writes the copies of the data block 5 to the storage area of the storage medium 4 indicated by the write area identification information stored in the write area information memory 3b.

As a result of this process of the storage medium control unit 3e, the data block 5 is written to the storage area of the storage medium 4 the number of times specified by the same data block write request.

The following describes the embodiment more concretely.

(Second Embodiment)

Figure 2:
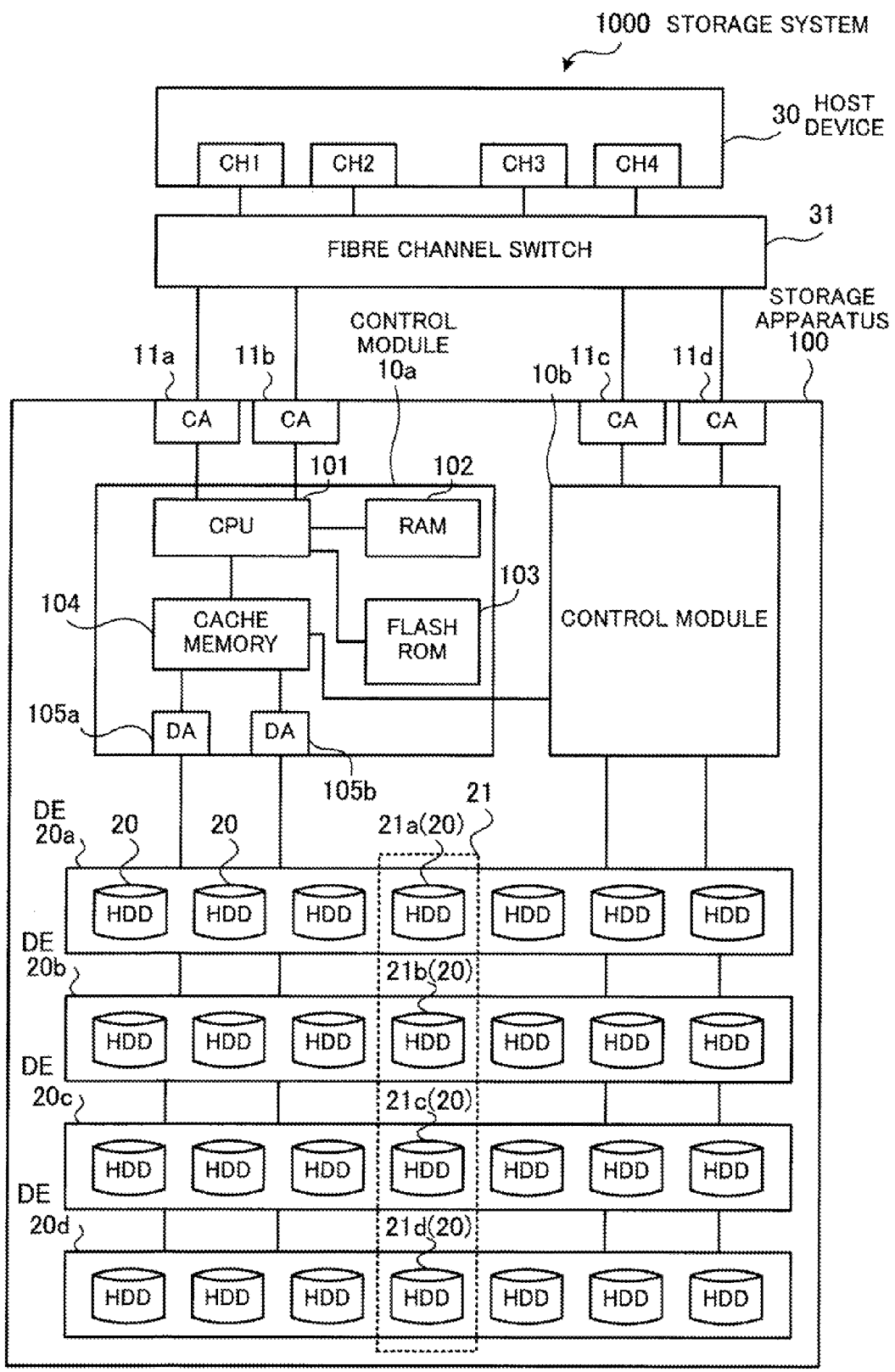
FIG. 2 is a block diagram of a storage system according to a second embodiment.

FIG. 2 is a block diagram of a storage system according to a second embodiment.

The illustrated storage system 1000 includes a host device 30 and a storage apparatus 100 connected to the host device 30 via a fibre channel (FC) switch 31. FIG. 2 illustrates a situation where one host device 30 is connected to the storage apparatus 100. Alternatively, a plurality of host devices may be connected to the storage apparatus 100. In addition, the host device 30 and storage apparatus 100 may be connected to each other using an interface other than FC, such as Serial Attached SCSI (SAS) or iSCSI.

The storage apparatus 100 includes drive enclosures (DE) 20a, 20b, 20c, and 20d each provided with a plurality of HDDs 20, and control modules (CM) 10a and 10b for managing the physical storage areas of these drive enclosures 20a, 20b 20c, and 20d with the Redundant Arrays of Inexpensive/Independent Disks (RAID) technology. This embodiment uses the HDDs 20 as storage media that are provided in the drive enclosures 20a, 20b, 20c, and 20d. Alternatively, another storage medium such as SSD may be used. In the following description, a plurality of HDDs 20 provided in the drive enclosures 20a, 20b, 20c, and 20d is collectively referred to as "HDD group 20" when these HDDs do not need to be treated individually. A total capacity of the HDD group 20 may range from 600 GB (Giga Byte) to 240 TB (Tera Byte).

The storage apparatus 100 provides redundancy by using the two control modules 10a and 10b. The number of control modules provided in the storage apparatus 100 may not be limited to two, and three or more control modules may be used for providing redundancy or only one control module 10a may be used.

The control modules 10a and 10b are one example of a control apparatus, and have identical hardware configuration.

The control module 10a is connected to Channel Adapters (CA) 11a and 1ib via internal buses. The control module 10b is connected to the channel adapters 11c and 11d via internal buses.

The channel adapters 11a, 11b, 11c, and 11d are connected to the fibre channel switch 31, and are connected to channels CH1, CH2, CH3, and CH4 of the host device 30 via the fibre channel switch 31. The channel adapters 11a, 11b, 11c, and 11d function as interfaces for communicating data between the host device 30 and the control modules 10a and 10b.

The control modules 10a and 10b employ the RAID technology to control data access requests that are issued by the host device 30 for accessing data in the physical storage areas of the HDDs 20 provided in the drive enclosures 20a, 20b, 20c, and 20d.

The control modules 10a and 10b have the identical hardware configuration, and therefore the hardware configuration of the control module 10a will now be described by way of example.

The control module 10a includes a CPU 101, Random Access Memory (RAM) 102, flash Read Only Memory (ROM) 103, cache memory 104, and device adapters (DA) 105a and 105b.

The CPU 101 executes programs stored in the flash ROM 103 or the like to control the entire operation of the control module 10a. The RAM 102 temporarily stores part of the programs to be executed by the CPU 101 and various data to be used in the execution of the programs. The flash ROM 103 is a non-volatile memory, and stores the pograms to be executed by the CPU 101 and various data to be used in the execution of the programs.

The flash ROM 103 is used for saving data stored in the data memory area of the cache memory 104 if an electric power failure or some other accident occurs in the storage apparatus 100.

The cache memory 104 temporarily stores data to be written to the HDD group 20 according to a request from the host device 30 or data read from the HDD group 20.

The cache memory 104 also temporarily stores data to be used while the CPU 101 operates. As this cache memory 104, a volatile semiconductor device such as SRAM, for example, may be used. In addition, the cache memory 104 may have a storage capacity of 2 to 64 GB, for example, but is not limited thereto.

The device adapters 105a and 105b are connected to the drive enclosures 20a, 20b, 20c, and 20d. These device adapters 105a and 105b function as interfaces for communicating data between the HDD group 20 provided in the drive enclosures 20a, 20b, 20c, and 20d and the cache memory 104. The control module 10a communicates data with the HDD group 20 provided in the drive enclosures 20a, 20b, 20c, and 20d via the device adapters 105a and 105b.

The control module 10a is connected to the control module 10b via a router (not illustrated). For example, when the host device 30 transmits data to be written to the HDD group 20, to the control module 10a via the channel adapter 11a, the CPU 101 receives and stores the data in the cache memory 104. In addition to this storing, the CPU 101 gives the received data to the control module 10b via the router. The control module 10b stores the data received by a CPU provided in the control module 10b, in a cache memory provided in the control module 10b. As a result, the same data is stored in the cache memory 104 of the control module 10a and the cache memory of the control module 10b.

In the drive enclosures 20a, 20b, 20c, and 20d, a RAID group is formed of one or more of the plurality of HDDs 20 provided in the drive enclosures 20a, 20b, 20c, and 20d. This RAID group is called "logical volume", "virtual disk", "RAID Logical Unit (RLU)" or the like.

A RAID group 21 illustrated in FIG. 2 is a RAID 5 group. The HDDs 20 forming this RAID group 21 are given different reference numerals (HDD 21a, 21b, 21c, and 21d) to distinguish from the other HDDs 20. That is, the RAID group 21 is formed of the HDDs 21a, 21b, 21c, and 21d, and operates as a RAID 5 (3+1). The illustrated RAID configuration of the RAID group 21 is just one example, and another configuration may be employed. For example, the RAID group 21 may have a desired number of HDDs 20. In addition, another RAID level such as RAID 6 may be employed for the RAID group 21.

The RAID storage area of the RAID group 21 is logically divided into one or plural storage areas. Each logical storage area is given (assigned) a Logical Unit Number (LUN). The following describes how the control module 10a operates when the host device 30 makes data access by specifying an LUN and Logical Block Address (LBA) in the RAID group 21.

The host device 30 instructs the control module 10a to write a data block of LBA size to a specified LBA of a specified LUN. To make such an instruction, the host device 30 issues a WRITE SAME command or WRITE command (hereinafter, Write-related command) to the control module 10a.

The WRITE command is a command that the host device 30 issues to instruct the control module 10a to write a data block prepared by the host device 30. The WRITE command includes data that specifies an LUN and LBA to indicate where the instructed writing begins, and the data block to be written.

The WRITE SAME command is a command that the host device 30 issues to instruct the control module 10a to write a to-be-copied data block a specified number of times to an LUN in the RAID group 21. The WRITE SAME command includes data that specifies an LUN and LBA to indicate where the instructed writing of the to-be-copied data block begins and the number of LBAs where the to-be-copied data block needs to be successively written.

For example, the host device 30 issues such a WRITE SAME command to instruct the control module 10a to write a data block to 10 successive LBAs starting from a specified LBA on a specified LUN. After issuing the WRITE SAME command, the host device 30 sends the to-be-copied data block to the storage apparatus 100.

The control module 10a with the above hardware configuration has the following functions.

Figure 3:
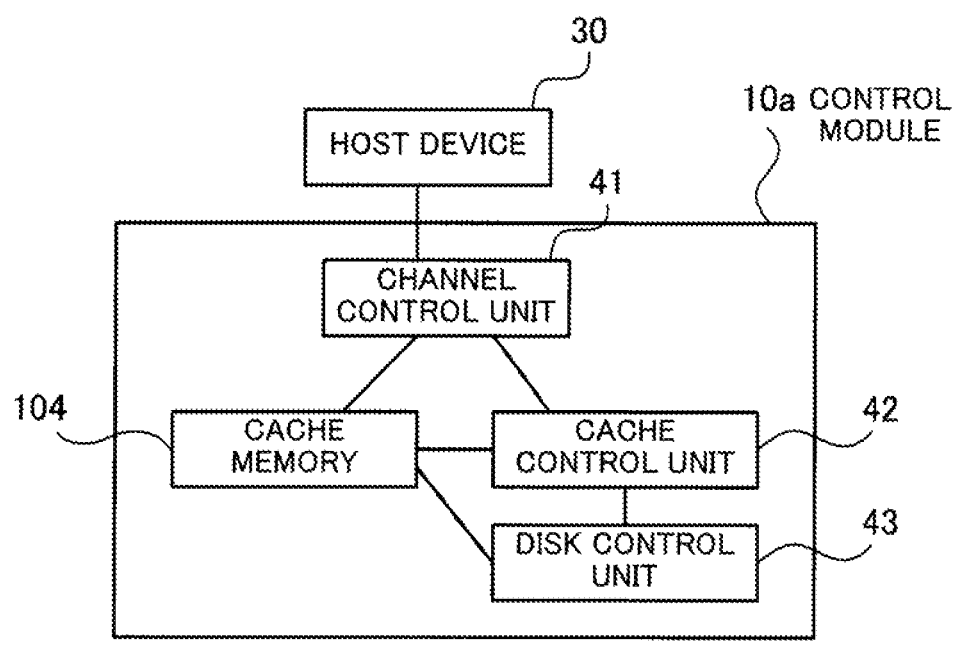
FIG. 3 is a functional block diagram of a control module according to the second embodiment.

FIG. 3 is a functional block diagram of a control module according to the second embodiment.

The control module 10a has a channel control unit 41, cache control unit 42, and disk control unit 43. The cache control unit 42 and disk control unit 43 are realized by the CPU 101. In this connection, the cache control unit 42 is one example of a unit for setting write area identification information and zero data identification information. The disk control unit 43 is one example of a storage medium control unit.

The channel control unit 41 receives various commands such as a WRITE SAME command and various data such as a to-be-copied data block from the host device 30, and gives them to the cache control unit 42.

The cache control unit 42 manages the data memory area of the cache memory 104 on a cache page basis. Each cache page is used in association with LBAs of an LUN belonging to the RAID group 21. Each cache page of this embodiment has 128 LBAs, for example. One LBA has 512 bytes, for example, and is given an 8-byte Block Check Code (BCC). Hereinafter, a memory area of a cache page corresponding to each LBA of an LUN belonging to the RAID group 21 is referred to as "cache page LBA".

The cache control unit 42 creates a management table for cache page LBAs. This management table is stored in the cache memory 104. By creating a management table, a cache page corresponding to the management table is secured in the cache memory 104.

Then, the cache control unit 42 controls management tables and cache pages according to various commands issued from the host device 30. The processes according to these various commands will be described in detail later.

Figure 4:
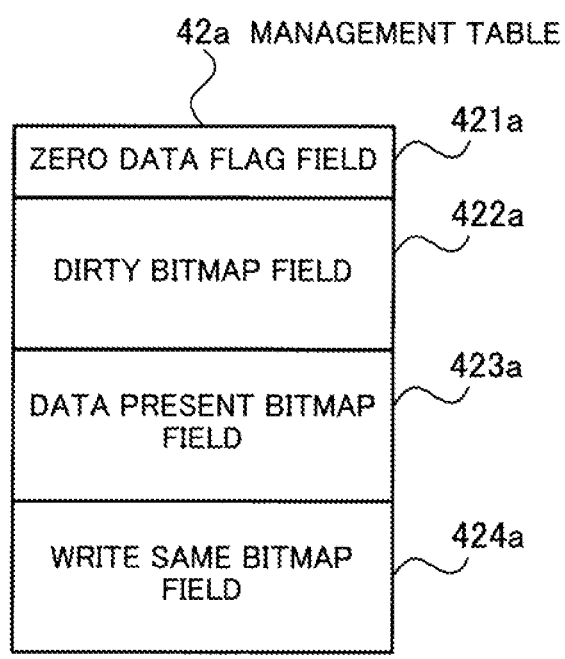
FIG. 4 is a view explaining a management table according to the second embodiment.

FIG. 4 is a view explaining a management table according to the second embodiment.

The management table 42a is a table for managing data blocks for one cache page. The management table 42a has a zero data flag field 421a, dirty bitmap field 422a, data present bitmap field 423a, and WRITE SAME bitmap field 424a.

The zero data flag field 421a is a field for managing a zero data flag indicating that a data block received by the control module 10a from the host device 30 is a zero data block containing only zero data. That is, if a received data block is a zero data block, a zero data flag is set. The zero data flag is one example of zero data identification information.

The dirty bitmap field 422a is a field for managing bitmaps (1 or 0) indicating where in a cache page dirty data blocks are stored. A dirty data block is a data block that is stored in a cache page but has not been written to the HDDs 20 forming the RAID group 21. Hereinafter, the bitmaps in the dirty bitmap field 422a are referred to as "dirty bitmaps". The cache control unit sets "1" to a dirty bitmap corresponding to an area where a dirty data block is stored in a cache page.

The data present bitmap field 423a is a field for managing bitmaps indicating where in a cache page data blocks are stored. The cache control unit 42 sets "1" to a bitmap corresponding to an area where a data block is stored in a cache page. When receiving a data read request from the host device 30, for example, the cache control unit 42 checks this data present bitmap field 423a to determine whether or not the read-requested data block exists in a cache page corresponding to the management table 42a.

The WRITE SAME bitmap field 424a is a field for managing bitmaps in such a way that "1" is set to as many bitmaps as the number of LBAs for which copies of a to-be-copied data block are produced, starting from a cache page LBA specified by a WRITE SAME command for indicating where the writing of the to-be-copied data block begins. Hereinafter, the bitmaps in the WRITE SAME bitmap field 424a are referred to as "WRITE SAME bitmaps". In this connection, the WRITE SAME bitmaps are one example of write area identification information.

Figure 5:
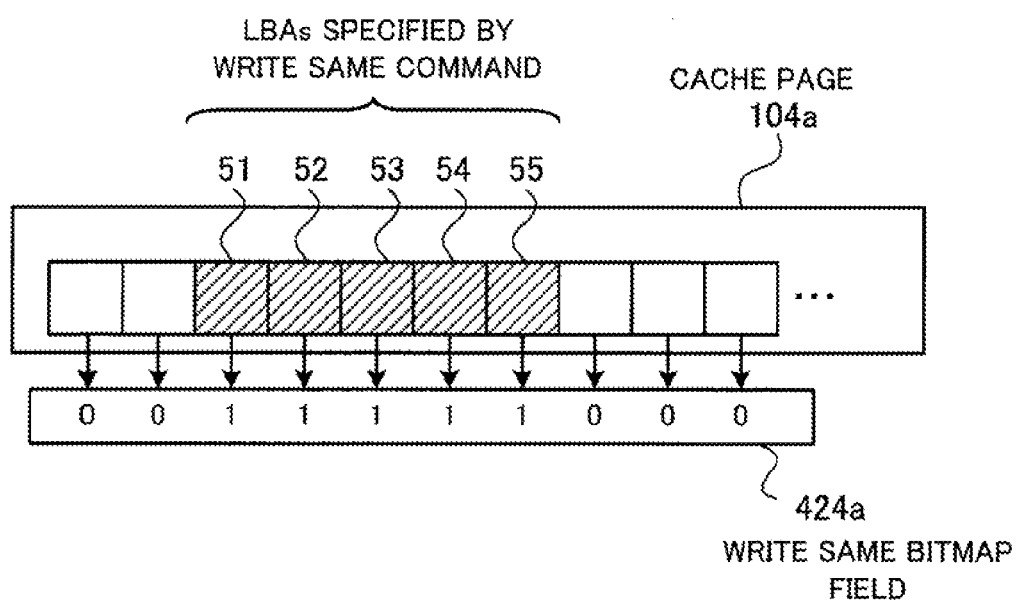
FIG. 5 is a view explaining a WRITE SAME bitmap field.

FIG. 5 is a view explaining a WRITE SAME bitmap field.

FIG. 5 illustrates a cache page 104a which is secured by the cache control unit 42 creating a management table 42a.

The WRITE SAME bitmap field 424a has WRITE SAME bitmaps corresponding to respective 128 LBAs of the cache page 104a.

FIG. 5 exemplifies the case where a WRITE SAME command is issued, which specifies LBA 51 as an LBA at which the writing of a to-be-copied data block begins, and also specifies five as the number of LBAs for writing the to-be-copied data block. The cache control unit 42 sets "1" to the WRITE SAME bitmaps corresponding to LBAs 51 to 55 in the WRITE SAME bitmap field 424a. The LBAs 51 to 55 of the cache page 104a illustrated in FIG. 5 indicate a range of LBAs for the writing specified by the WRITE SAME command, and do not indicate a situation where the to-be-copied data block is actually written to LBAs 51 to 55.

Referring back to FIG. 3, the disk control unit 43 writes a data block requested to be written by a Write-related command issued from the host device 30, to an LUN belonging to the RAID group 21, independently of the control of the cache control unit 42. A method of writing a data block by the disk control unit 43 will be described in detail later.

On the other hand, when receiving a READ command from the host device 30, the disk control unit 43 reads a data block from the LBA of the LUN specified by the READ command, and writes the data block to the data memory area of the cache memory 104. This READ command is a command that the host device 30 issues to specify an LUN and LBA, which indicate where a data block (hereinafter, referred to as "read-requested data block") requested to be read by the host device 30 is stored, so as to have the data block read from the specified LBA of the specified LUN.

The following describes how the control module 10a operates when receiving a Write-related command (write-related command process).

Figure 6:
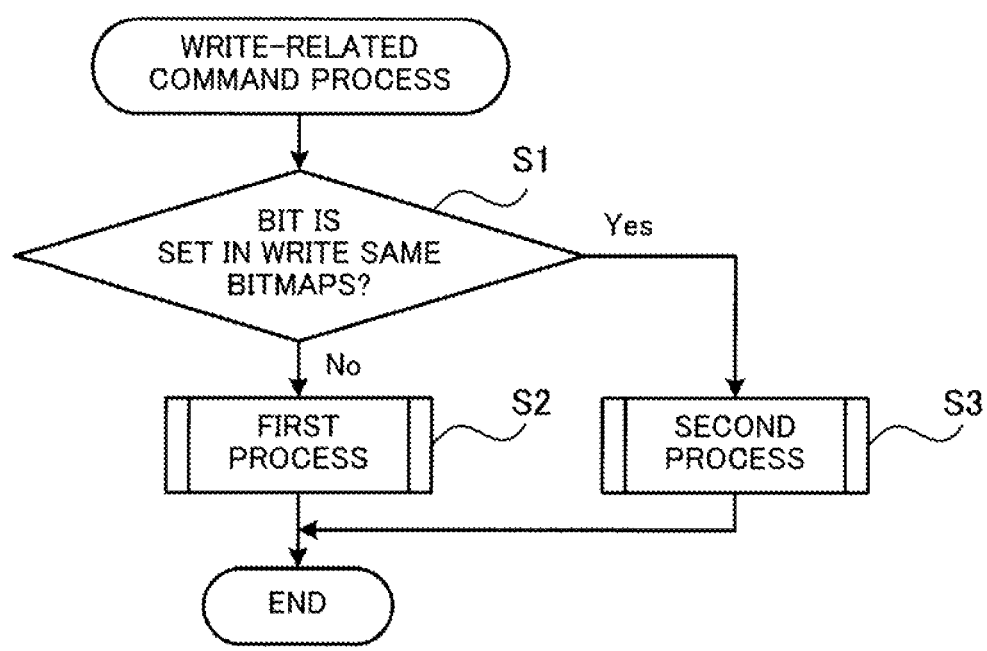
FIG. 6 is a flowchart of a Write-related command process.

FIG. 6 is a flowchart of a Write-related command process.

At step S1, the cache control unit 42 checks the WRITE SAME bitmap field 424a to determine whether any WRITE SAME bitmaps have "1". If there are WRITE SAME bitmaps with "1" (yes at step S1), the process goes on to step S3. If no WRITE SAME bitmap has "1" (no at step S1), the process goes on to step S2.

At step S2, the cache control unit 42 processes the WRITE-related command (first process). This first process is performed in the case where no WRITE SAME bitmap has "1". When the first process is completed, the process of FIG. 6 is terminated.

At step S3, the cache control unit 42 processes the Write-related command (second process). This second process is performed in the case where there are WRITE SAME bitmaps with "1". When the second process is completed, the process of FIG. 6 is terminated.

The following describes the first process of step S2.

Figure 7:
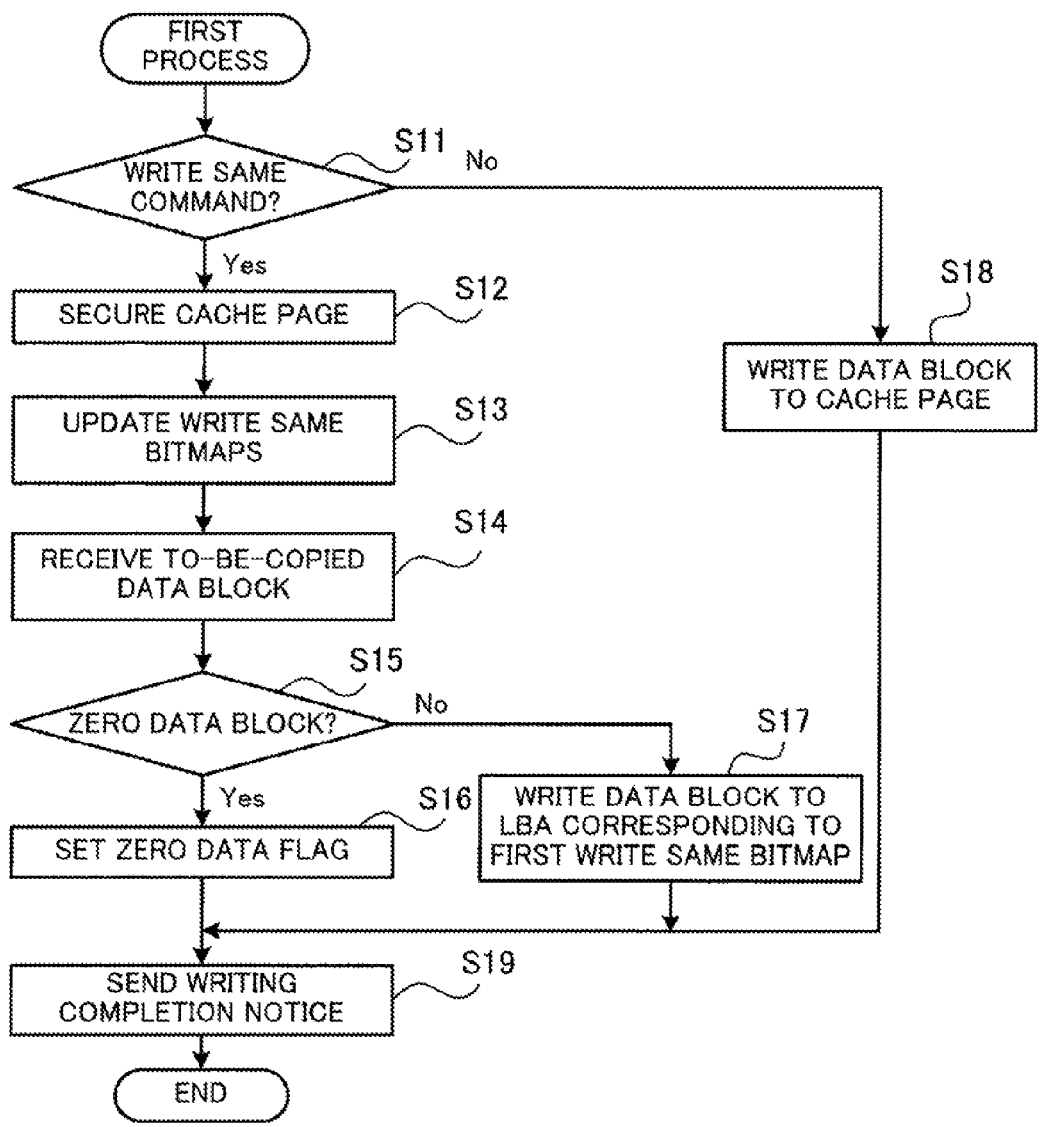
FIG. 7 is a flowchart of a first process according to the second embodiment.

FIG. 7 is a flowchart of the first process according to the second embodiment.

At step S11, the cache control unit 42 determines whether the received Write-related command is a WRITE SAME command or not. If the Write-related command is a WRITE SAME command (yes at step S11), the process goes on to step S12. If it is not (no at step S11), meaning that the received Write-related command is a WRITE command, the process goes on to step S18.

At step S12, the cache control unit 42 creates a management table 42a corresponding to the WRITE SAME command received from the host device 30. By creating the management table 42a, a corresponding cache page 104a is secured. Then, the process goes on to step S13.

At step S13, the cache control unit 42 analyzes the WRITE SAME command identified at step S11. Then, the cache control unit 42 sets "1" to as many WRITE SAME bitmaps in the WRITE SAME bitmap field 424a as the number of LBAs specified by the WRITE SAME command. Then, the process goes on to step S14.

At step S14, the cache control unit 42 receives a to-be-copied data block from the host device 30, and then the process goes on to step S15.

At step S15, the cache control unit 42 determines whether the to-be-copied data block received at step S14 is a zero data block containing only zero data or not. If the data block is a zero data block (yes at step S15), the process goes on to step S16. Otherwise (no at step S15), the process goes on to step S17.

At step S16, the cache control unit 42 sets a zero data flag in the zero data flag field 421a. Then, the process goes on to step S19.

At step S17, the cache control unit 42 writes the to-be-copied data block received at step S14 to the cache page LBA corresponding to the first of the WRITE SAME bitmaps with "1", in the cache page 104a secured at step S12. As a result, the to-be-copied data block received at step S14 is written to the cache page LBA of the secured cache page 104a corresponding to the LBA specified by the WRITE SAME command analyzed at step S13. Then, the process goes on to step S19.

At step S18, the cache control unit 42 secures the cache page 104a, and writes the data block received from the host device 30 to the cache page LBA specified by the WRITE command in the secured cache page 104a. In addition, the cache control unit 42 sets "1" to a bitmap of the data present bitmap field 423a corresponding to the cache page LBA of the cache page 104a where the data block has been written. In addition, the cache control unit 42 sets "1" to a bitmap of the dirty bitmap field 422a corresponding to the cache page LBA of the cache page 104a where the data block has been written. Then, the process goes on to step S19.

At step S19, the cache control unit 42 sends the host device 30 a completion notice of the data writing based on the Write-related command. Then, the process of FIG. 7 is completed.

According to the process of FIG. 7, if the to-be-copied data block is a zero data block containing only zero data, the completion notice of the writing of the data block according to a WRITE SAME command is given to the host device 30 without writing the data block to the cache page 104a. Therefore, it reduces the time to give a response to the host device 30, as compared with the case where such a completion notice is sent to the host device after the received zero data block is written to the cache page 104a.

By the way, if the to-be-copied data block is a non-zero data block containing non-zero data, on the other hand, after the process of FIG. 7 is complete, the cache control unit 42 produces copies of the data block stored in the cache page LBA of the cache page 104a where the to-be-copied data block was written at step S17 of FIG. 7, and stores the copies in cache page LBAs of the cache page 104a corresponding to the other WRITE SAME bitmaps with "1". After this copying to the cache page LBAs of the cache page 104a is complete, these data blocks are written to the LBAs of the LUN belonging to to the RAID group 21 corresponding to the cache page LBAs of the cache page 104a where they have been stored.

In addition, the disk control unit 43 receives an instruction for writing to a disk from the cache control unit 42, and writes the to-be-copied data block, which was received from the host device 30 at step S14 of FIG. 7, to the LBA of the LUN specified by the Write-related command, independently of the first process. To this end, the disk control unit 43 performs the following process.

The disk control unit 43 checks the zero data flag field 421a, and if determining that the to-be-copied data block is a zero data block containing only zero data, specifies the cache page LBAs of the cache page 104a corresponding to the WRITE SAME bitmaps set to "1" at step S13 of FIG. 7. Then, the disk control unit 43 writes the zero data block to the LBAs of the LUN belonging to the RAID group 21 corresponding to the specified cache page LBAs.

The following describes the second process of step S3.

Figure 8:
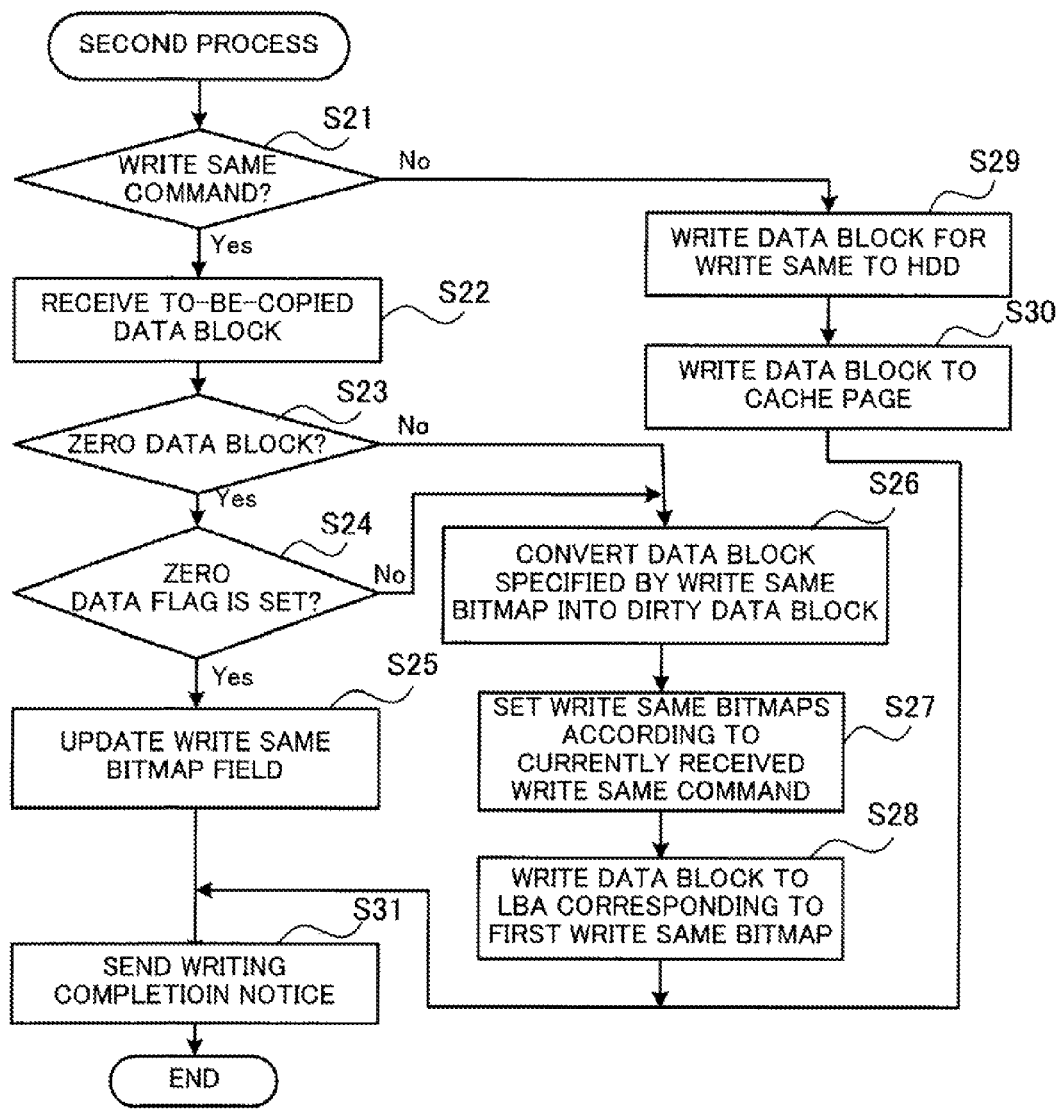
FIG. 8 is a flowchart of a second process according to the second embodiment.

FIG. 8 is a flowchart of the second process according to the second embodiment.

At step S21, the cache control unit 42 determines whether the Write-related command received from the host device 30 is a WRITE SAME command or not. If the Write-related command is a WRITE SAME command (yes at step S21), the process goes on to step S22. If it is not (no at step S21), meaning that the received Write-related command is a WRITE command (no at step S21), the process goes on to step S29.

At step S22, the cache control unit 42 receives a to-be-copied data block from the host device 30, and then the process goes on step S23.

At step S23, the cache control unit 42 determines whether or not the to-be-copied data block received at step S22 is a zero data block containing only zero data. If it is a zero data block (yes at step S23), the process goes on to step S24. Otherwise (no at step S23), the process goes on to step S26.

At step S24, the cache control unit 42 checks the zero data flag field 421a of the management table 42a to determine whether a zero data flag is set. If a zero data flag is set (yes at step S24), the process goes on to step S25. Otherwise (no at step S24), the process goes on to step S26.

At step S25, the cache control unit 42 checks the WRITE SAME bitmap field 424a, and creates a WRITE SAME bitmap pattern by merging the existing WRITE SAME bitmaps with "1" and WRITE SAME bitmaps set to "1" by the WRITE SAME command identified at step S21. Then, the cache control unit 42 updates the WRITE SAME bitmap field 424a with the created WRITE SAME bitmap pattern. Then, the process goes on to step S31.

At step S26, the cache control unit 42 converts the data blocks specified by the WRITE SAME bitmaps stored in the WRITE SAME bitmap field 424a into dirty data blocks. More specifically, the cache control unit 42 specifies the cache page LBAs of the cache page 104a corresponding to the WRITE SAME bitmaps with "1". Then, the cache control unit 42 writes the data block stored in a cache page LBA of the cache page 104a corresponding to the first of the WRITE SAME bitmaps with "1", to the specified cache page LBAs of the cache page 104a. Then, the cache control unit 42 sets "1" to the dirty bitmaps of the dirty bitmap field 422a corresponding to the areas where the data blocks have been written. Then, the process goes on to step S27.

At step S27, the cache control unit 42 clears the WRITE SAME bitmaps of the WRITE SAME bitmap field 424a (sets "0" to all). Then, the cache control unit 42 sets "1" to as many WRITE SAME bitmaps in the WRITE SAME bitmap field 424a as the specified number of LBAs starting with the LBA specified by the WRITE SAME command identified at step S21. Then, the process goes on to step S28.

At step S28, the cache control unit 42 writes the to-be-copied data block received at step S22 to the cache page LBA of the cache page 104a corresponding to the first of the WRITE SAME bitmaps with "1" of the WRITE SAME bitmap field 424a. Then, the process goes on to step S31.

At step S29, the cache control unit 42 checks the WRITE SAME bitmap field 424a, and writes the data blocks from the cache page LBAs of the cache page 104a corresponding to the WRITE SAME bitmaps with "1", to the LBAs of the LUN belonging to the RAID group 21 corresponding to the cache page LBAs of the cache page 104a, in the same way as the writing process of the disk control unit 43. Then, the process goes on to step S30.

At step S30, the cache control unit 42 writes the data block received from the host device 30 to the cache page LBA of the cache page 104a. In addition, the cache control unit 42 sets "1" to a bitmap of the data present bitmap field 423a corresponding to the cache page LBA of the cache page 104a where the data block has been written. Then, the process goes on to step S31.

At step S31, the cache control unit 42 sends the host device 30 a completion notice of the data writing. Then, the process of FIG. 8 is completed.

The following describes a specific example of the process of step S26 of FIG. 8.

Figure 9:
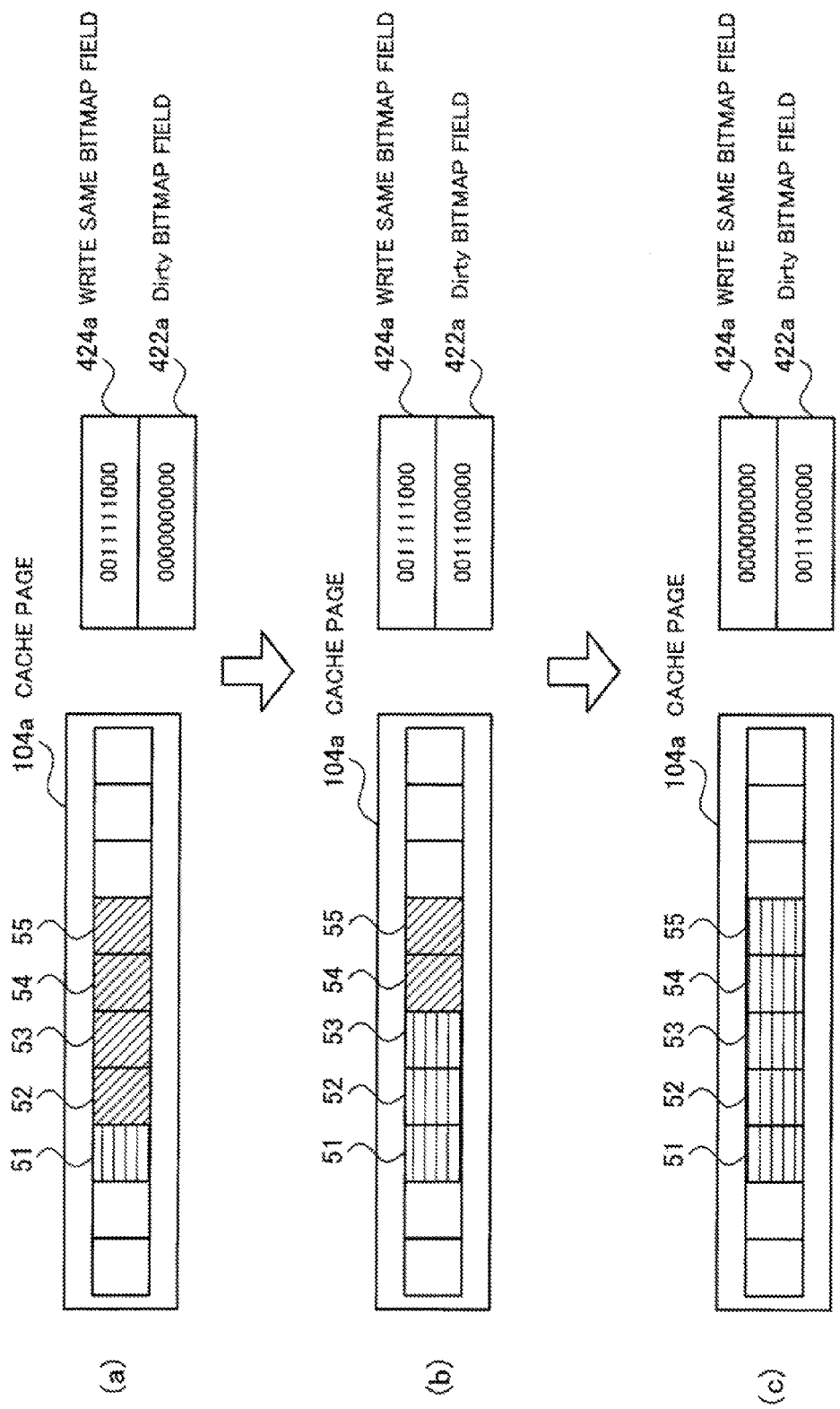
FIG. 9 is a view explaining how to convert WRITE SAME bitmaps into dirty bitmaps.

FIG. 9 is a view explaining how to convert WRITE SAME bitmaps into dirty bitmaps.

FIG. 9(a) illustrates a cache page 104, WRITE SAME bitmap field 424a, and dirty bitmap field 422a before WRITE SAME bitmaps are converted into dirty bitmaps.

Actual data is stored in cache page LBA 51 of the cache page 104a. No actual data is stored in cache page LBAs 52 to 55, but "1" is set to the corresponding WRITE SAME bitmaps.

FIG. 9(b) illustrates the cache page 104a, WRITE SAME bitmap field 424a, and dirty bitmap field 422a in the course of converting the WRITE SAME bitmaps into the dirty bitmaps.

The cache control unit 42 checks the WRITE SAME bitmaps, and stores copies of the data block stored in cache page LBA 51, in cache page LBAs 52, 53, 54, and 55 in this order. When this copying is completed, the cache control unit 42 sets "1" to the dirty bitmaps of bits corresponding to these cache page LBAs. Through the process of FIG. 9B, the WRITE SAME bitmaps are converted into the dirty bitmaps. During this conversion, the values of the WRITE SAME bitmaps in the WRITE SAME bitmap field 424a are not changed.

FIG. 9(c) illustrates the cache page 104a, WRITE SAME bitmap field 424a, and dirty bitmap field 422a when the conversion of the WRITE SAME bitmaps into the dirty bitmaps is complete. When the conversion of the WRITE SAME bitmaps into the dirty bitmaps is completed, the WRITE SAME bitmaps are cleared as described earlier for step S27.

The following describes how the control module 10a processes a READ command received from the host device (READ command process).

Figure 10:
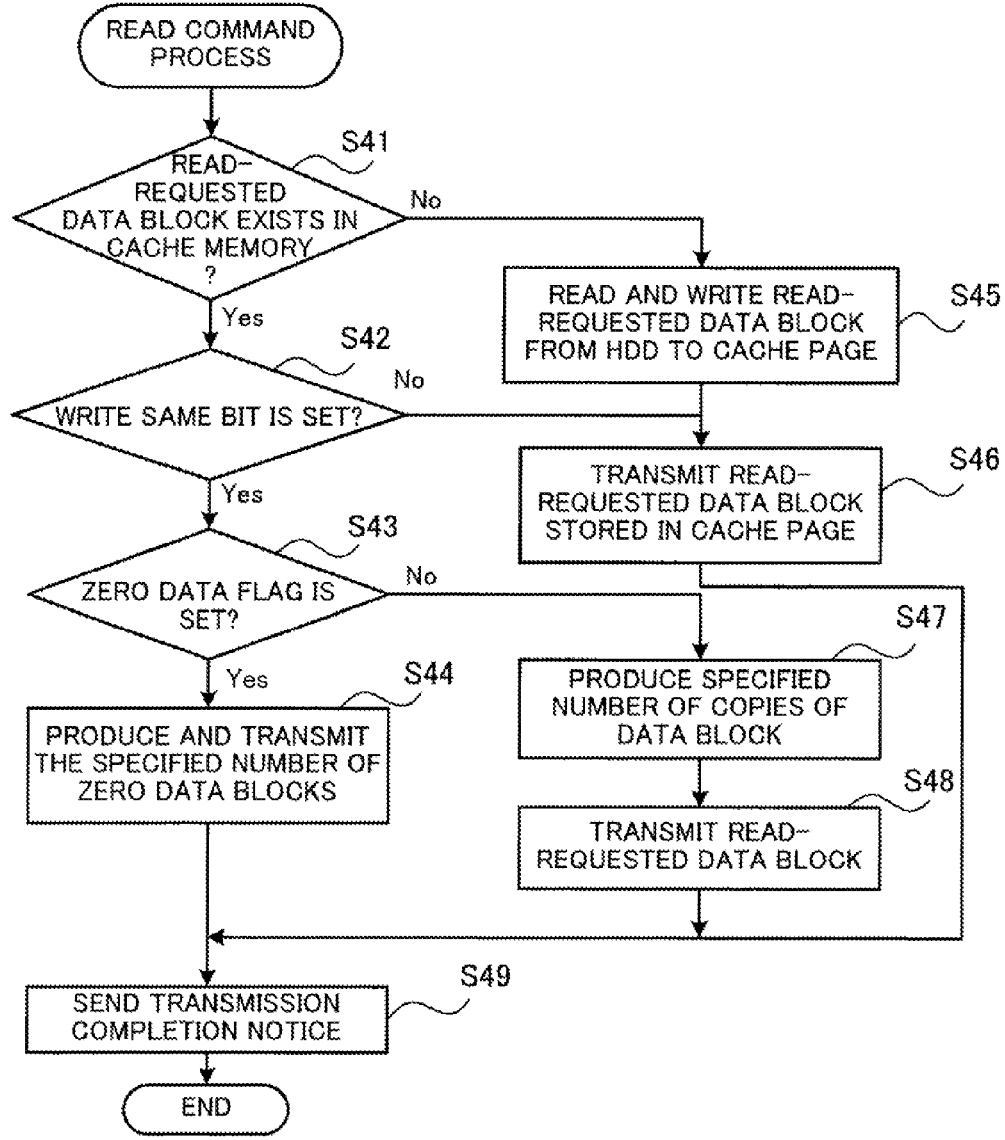
FIG. 10 is a flowchart of a READ command process according to the second embodiment.

FIG. 10 is a flowchart of a READ command process according to the second embodiment.

At step S41, the cache control unit 42 determines whether a read-requested data block specified by a READ command exists in the cache memory 104 or not (there is a cache hit or not). If the read-requested data block exists (yes at step S41), the process goes on to step S42. Otherwise (no at step S41), the process goes on to step S45.

At step S42, the cache control unit 42 checks the WRITE SAME bitmap field 424a to determine whether a WRITE SAME bitmap corresponding to the LBA and LUN specified by the READ command has "1". If this bitmap has "1" (yes at step S42), meaning that the read-requested data block is a data block that was written in response to a WRITE SAME command, the process goes on to step S43. If the bitmap does not have "1" (no at step S42), meaning that the read-requested data block is a data block that was written in response to a WRITE command, the process goes on to step S46.

At step S43, the cache control unit 42 checks the zero data flag field 421a to determine whether a zero data flag is set. If a zero data flag is set (yes at step S43), the process proceeds to step S44. Otherwise (no at step S43), the process goes on to step S47.

At step S44, the cache control unit 42 produces as many zero data blocks as the number of LBAs specified by the READ command. Then, the cache control unit 42 transmits the produced zero data blocks to the host device 30. Then, the process goes on to step S49.

At step S45, the cache control unit 42 reads the data block from the LBA of the LUN belonging to the RAID group 21 indicated by the LUN and LBA specified by the READ command. The read data block is taken as a read-requested data block. The cache control unit 42 then writes the read data block to the cache page 104a. Then, the process goes on to step S46.

At step S46, the cache control unit 42 transmits the read-requested data block read at step S45 or the read-requested data block stored in the cache page 104a to the host device 30. Then, the process goes on to step S49.

At step S47, the cache control unit 42 reads the data block, which was written to the cache page LBA at step S17 of FIG. 7, from the cache page 104a. Then, the cache control unit 42 produces as many copies of the read data block as the number of LBAs specified by the READ command. The produced data blocks are taken as read-requested data blocks. Then, the process goes on to step S48.

At step S48, the cache control unit 42 transmits the read-requested data blocks to the host device 30. Then, the process goes on to step S49.

At step S49, the cache control unit 42 sends the host device 30 a completion notice of the data transmission. Then, the process of FIG. 10 is terminated.

As described above, in the control module 10a, if the data block is a zero data block containing only zero data, the cache control unit 42 sends the host device 30 a completion notice of the data writing when a flag is set in the zero data flag field 421a. Therefore, it reduces the time to give a response to the host device 30, as compared with the case of sending such a completion notice after the received zero data block is written to the cache page 104a.

Even though the time to give a response to the host device 30 is reduced, the disk control unit 43 is still able to write the data block to an LUN belonging to the RAID group 21 by using WRITE SAME bitmaps.

In addition, when receiving a READ command, the cache control unit 42 is able to transmit a data block requested by the host device 30 by using the WRITE SAME bitmaps and zero data flag.

(Third Embodiment)

The following describes a storage system according to a third embodiment. Only different features of the storage system from that of the above-described second embodiment will be described, and the same features will not be described again.

In the storage system according to the third embodiment, control modules 10a and 10b manage write areas where data is written to an LUN belonging to the RAID group 21, on a cache page basis. The different features of the storage system according to the third embodiment from that according to the second embodiment are the structure of a management table that is provided in the control modules 10a and 10b, and a processing method using the management table.

Figure 11:
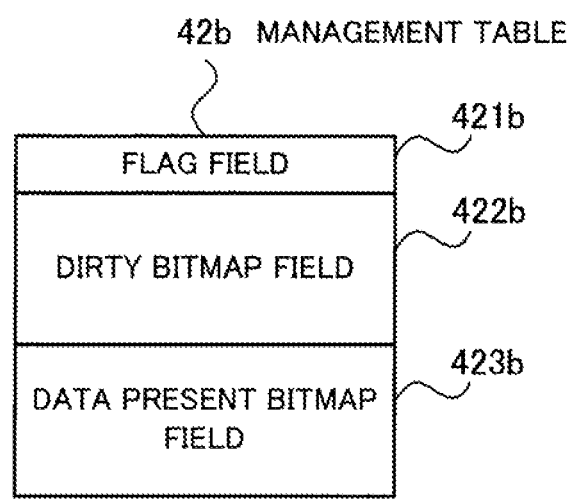
FIG. 11 illustrates a management table according to a third embodiment.

FIG. 11 illustrates a management table according to the third embodiment.

The illustrated management table 42b according to the third embodiment has a flag field 421b, dirty bitmap field 422b, and data present bitmap field 423b.

The flag field 421b is a field for managing a same data flag and zero data flag. The same data flag is a flag that indicates that data blocks indicated by dirty bitmaps have the same data contents. The zero data flag is a flag that indicates that data blocks indicated by dirty bitmaps are zero data blocks containing only zero data.

The dirty bitmap field 422b and data present bitmap field 423b have the same functions as the dirty bitmap field 422a and data present bitmap field 423a, respectively, and their explanation will not be repeated.

As compared with the management table 42a, this management table 42b does not have a WRITE SAME bitmap field, so that the management table 42b occupies a less memory area in the cache memory 104 than the management table 42a.

The following describes a first process performed by the control module 10a according to the third embodiment.

Figure 12:
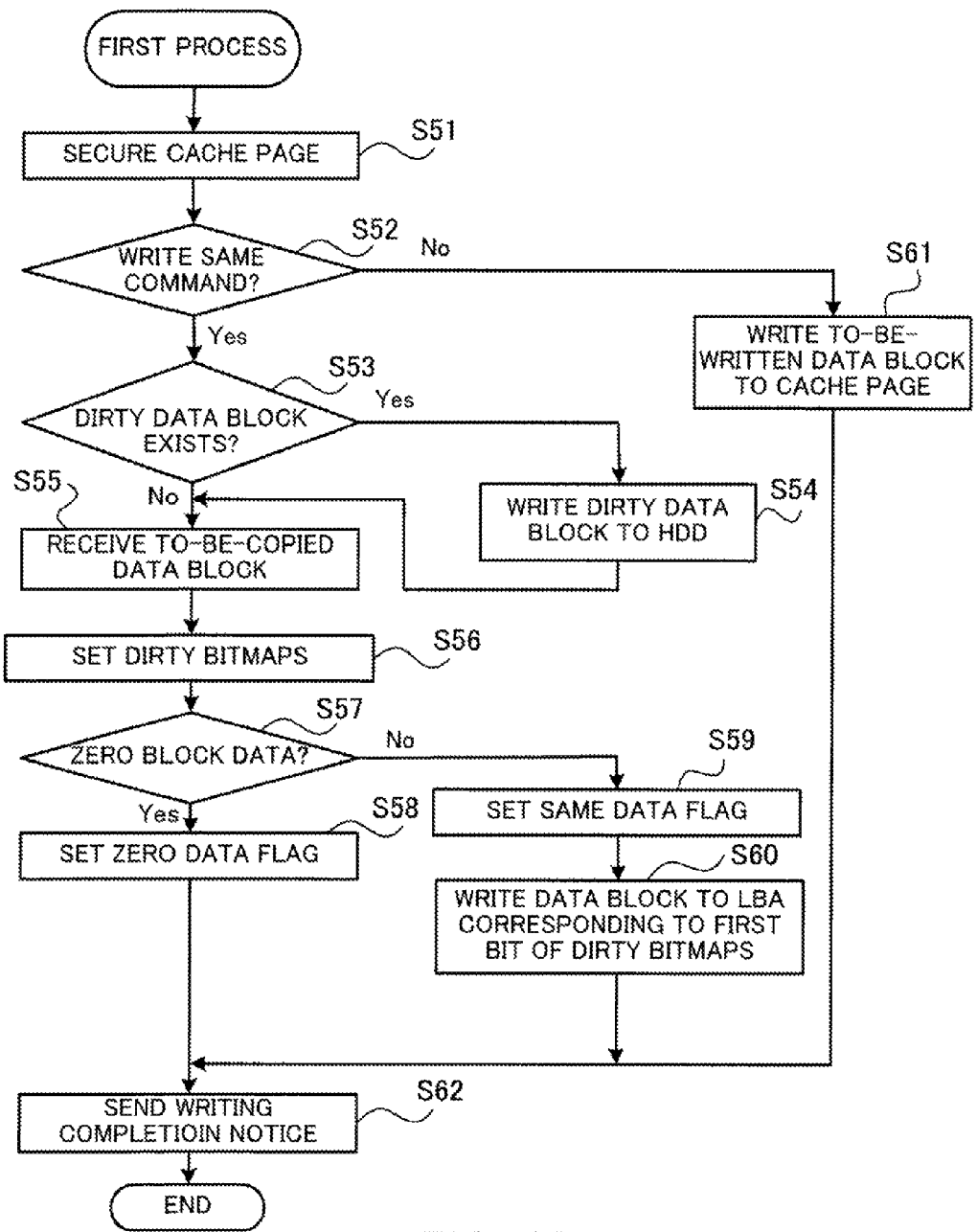
FIG. 12 is a flowchart of a first process according to the third embodiment.

FIG. 12 is a flowchart of a first process according to the third embodiment.

At step S51, the cache control unit 42, which has received a WRITE-related command from the host device 30, creates a management table 42b corresponding the WRITE-related command, thereby securing a cache page corresponding to the management table 42b. The process then goes on to step S52.

At step S52, the cache control unit 42 determines whether the received Write-related command is a WRITE SAME command or not. If the Write-related command is a WRITE SAME command (yes at step S52), the process goes on to step S53. Otherwise (no at step S52), the process goes on to step S61.

At step S53, the cache control unit 42 checks the dirty bitmap field 422b of the management table 42b to determine whether there are dirty bitmaps with "1", that is, whether dirty data blocks exist in the cache page 104a. If there are dirty bitmaps with "1" (yes at step S53), the process goes on to step S54. Otherwise (no at step S53), the process goes on to step S55.

At step S54, the cache control unit 42 writes the dirty data blocks from the cache page LBAs of the cache page 104a specified by the dirty bitmaps, to the LBAs of the LUN belonging to the RAID group 21 corresponding to the cache page LBAs where the specified dirty data blocks have been stored. Then, the process goes on to step S55.

At step S55, the cache control unit 42 receives a to-be-copied data block from the host device 30, and then the process goes on to step S56.

At step S56, the cache control unit 42 sets "1" to dirty bitmaps corresponding to the LBAs specified by the WRITE SAME command. Then, the process goes on to step S57.

At step S57, the cache control unit 42 determines whether the to-be-copied data block received at step S55 is a zero data block containing only zero data or not. If it is a zero data block (yes at step S57), the process goes on to step S58. Otherwise (no at step S57), the process goes on to step S59.

At step S58, the cache control unit 42 sets a zero data flag in the flag field 421b of the management table 42b. Then, the process goes on to step S62.

At step S59, the cache control unit 42 sets a SAME data flag in the flag field 421b of the management 42b. Then, the process goes on to step S60.

At step S60, the cache control unit 42 writes the to-be-copied data block received at step S55 to the cache page LBA corresponding to the first of the dirty bitmaps with "1", in the cache page 104a secured at step S51. The process then goes on to step S62.

At step S61, the cache control unit 42 writes the data block received from the host device 30 to the data memory area of the cache memory 104 corresponding to the management table 42b created at step S51. In addition, the cache control unit 42 sets "1" to the bitmap of the data present bitmap field 423b corresponding to the cache page LBA of the cache page 104a where the data block has been written. Then, the process goes on to step S62.

At step S62, the cache control unit 42 sends the host device 30 a completion notice of the data writing based on the WRITE SAME command. Then, the process of FIG. 12 is completed.

In the case where the to-be-copied data block is not a zero data block, the disk control unit 43 performs the following process. The disk control unit 43 writes the data block from the cache page LBA of the cache page 104a where the to-be-copied data block has been written, to the LBA of the LUN belonging to the RAID group 21 corresponding to the cache page LBA of the cache page 104a.

More specifically, after the process of FIG. 12 is completed, the disk control unit 43 receives an instruction for writing to a disk from the cache control unit 42, and writes the to-be-copied data block, which was received from the host device 30 at step S55 of FIG. 12, to the LBA of the LUN specified by the Write-related command, independently of the first process. The disk control unit 43 performs this writing as follows.

The disk control unit 43 checks the zero data flag of the flag field 421b, and if determining that the to-be-copied data block is a zero data block containing only zero data, the disk control unit 43 writes the zero data block to the LBA of the LUN belonging to the RAID group 21 corresponding to the cache page LBA of the cache page 104a corresponding to the management table 42b.

The following describes a second process according to the third embodiment.

Figure 13:
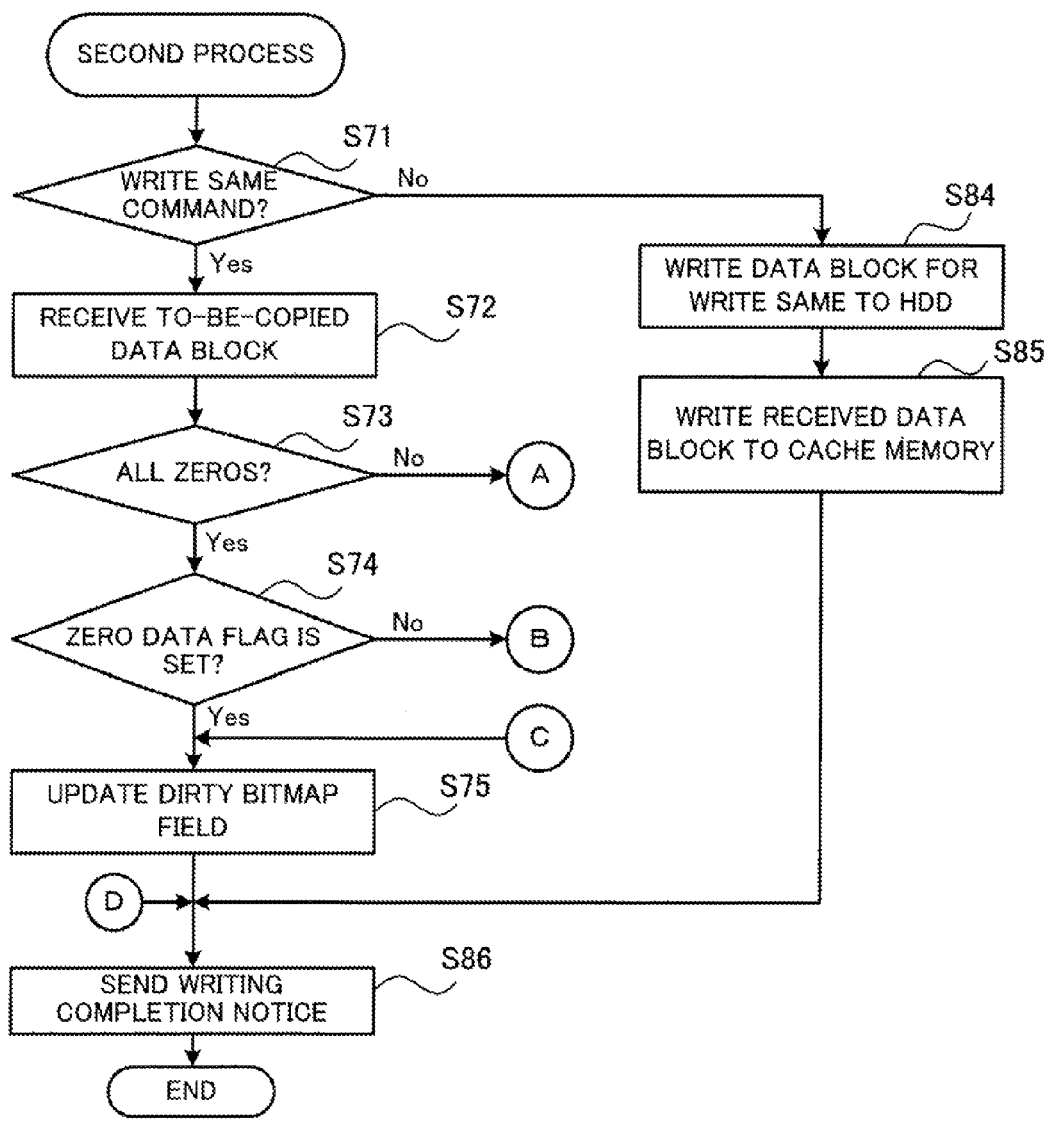
FIGS. 13 and 14 are a flowchart of a second process according to the third embodiment.
Figure 14:
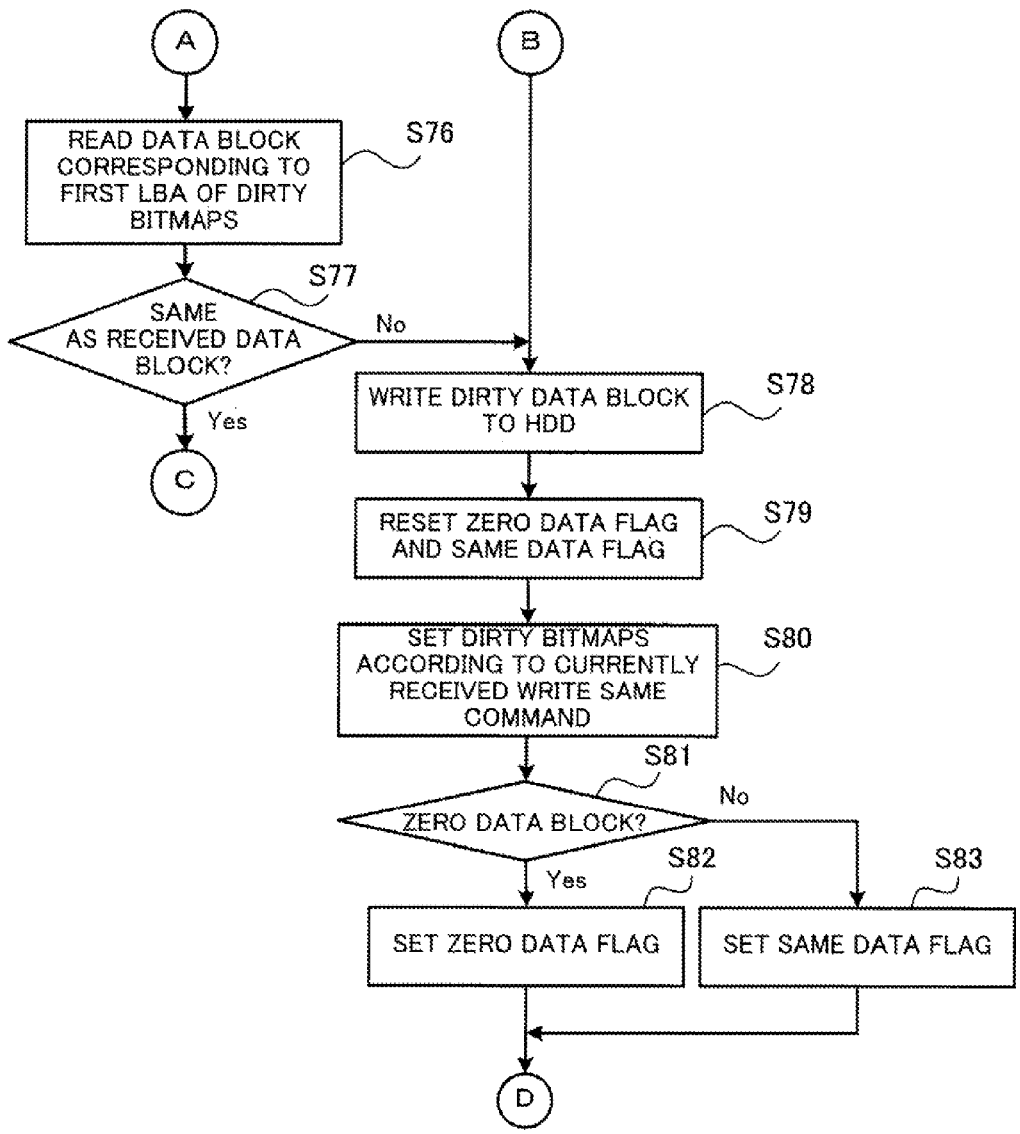

FIGS. 13 and 14 are a flowchart of a second process according to the third embodiment.

At step S71, the cache control unit 42 determines whether the Write-related command received from the host device 30 is a WRITE SAME command or not. If the Write-related command is a WRITE SAME command (yes at step S71), the process goes on to step S72. If it is not (no at step S71), meaning that the Write-related command is a WRITE command, the process goes on to step S84.

At step 72, the cache control unit 42 receives a to-be-copied data block from the host device 30, and then the process goes on to step S73.

At step S73, the cache control unit 42 determines whether the to-be-copied data block received at step S72 is a zero data block containing only zero data.

If it is a zero data block (yes at step S73), the process goes on to step S74. Otherwise (no at step S73), the process goes on to step S76.

At step S74, the cache control unit 42 checks the flag field 421b of the management table 42b to determine whether a zero data flag is set or not. If a zero data flag is set (yes at step S74), the process goes on to step S75. Otherwise (no at step S74), the process goes on to step S78.

At step S75, the cache control unit 42 checks the dirty bitmap field 422b, and creates a dirty bitmap pattern by merging the existing dirty bitmaps and dirty bitmaps set to "1" according to the WRITE SAME command identified at step S71. Then, the cache control unit 42 updates the dirty bitmap field 422b with the created dirty bitmap pattern. The process then goes on to step S86.

At step S76, the cache control unit 42 checks the dirty bitmap field 422b of the management table 42b, and reads the data block from the cache page LBA of the cache page 104a corresponding to the first of the dirty bitmaps. Then, the process goes on to step S77.

At step S77, the cache control unit 42 determines whether the data block read at step S76 is the same as that received at step S72. If these blocks are the same (yes at step S77), the process goes on to step S75. Otherwise (no at step S77), the process goes on to step S78.

At step S78, the cache control unit 42 writes the dirty data blocks of the cache page 104a specified by the dirty bitmaps, to the LBAs of the LUN belonging to the RAID group 21 corresponding to the cache page LBAs where the specified dirty data blocks have been stored. Then, the process goes on to step S79.

At step S79, the cache control unit 42 resets the zero data flag and same data flag of the flag field 421b of the management table 42b. Then, the process goes on to step S80.

At step S80, the cache control unit 42 clears the dirty bitmaps of the dirty bitmap field 422b. Then, the cache control unit 42 sets "1" to as many dirty bitmaps in the dirty bitmap field 422b as the specified number of LBAs starting with the LBA specified by the WRITE SAME command identified at step S71. Then, the process goes on to step S81.

At step S81, the cache control unit 42 determines whether or not the to-be-copied data block received at step S72 is a zero data block containing only zero data. If it is a zero data block (yes at step S81), the process goes on to step S82. Otherwise (no at step S81), the process goes on to step S83.

At step S82, the cache control unit 42 sets a zero data flag in the flag field 421b of the management table 42b. Then, the process goes on to step S86.

At step S83, the cache control unit 42 sets a same data flag in the flag field 421b of the management table 42b. Then, the process goes on to step S86.

At step S84, the cache control unit 42 checks the dirty bitmap field 422b, and writes the data blocks from the cache page LBAs of the cache page 104a corresponding to the dirty bitmaps with "1", to the LBAs of the LUN belonging to the RAID group 21 corresponding to the cache page LBAs of the cache page 104a, in the same way as the writing process of the disk control unit 43. Then the process goes on to step S85.

At step S85, the cache control unit 42 writes the data block received from the host device 30, to the cache page LBA of the cache page 104a. In addition, the cache control unit 42 sets "1" to the bitmap of the data present bitmap field 423b corresponding to the cache page LBA of the cache page 104a where the data block has been written. Then, the process goes on to step S86.

At step S86, the cache control unit 42 sends the host device 30 a completion notice of the data writing. Then, the process of FIG. 13 is completed.

Figure 15:
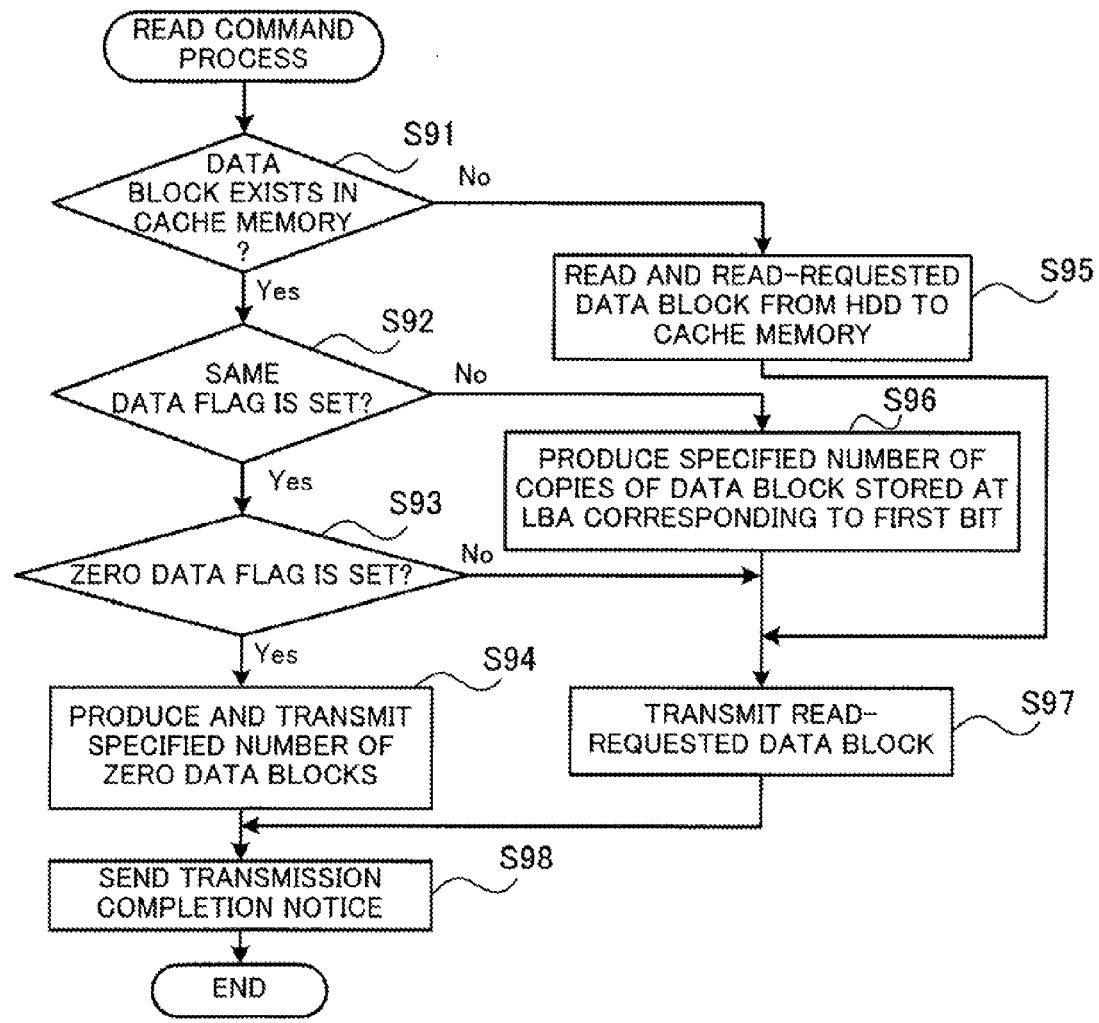
FIG. 15 is a flowchart of how to process a READ command according to the third embodiment.

FIG. 15 is a flowchart of a READ command process according to the third embodiment.

At step S91, the cache control unit 42 determines whether or not a read-requested data block specified by a READ command exists in the cache memory 104 (there is a cache hit or not). If the read-requested data block exists (yes at step S91), the process goes on to step S92. Otherwise (no at step S91), the process goes on to step S95.

At step S92, the cache control unit 42 checks the flag field 421b to determine whether a same data flag is set or not. If a same data flag is set (yes at step S92), the process goes on to step S93. Otherwise (no at step S92), the process goes on to step S96.

At step S93, the cache control unit 42 checks the flag field 421b to determine whether a zero data flag is set or not. If a zero data flag is set (yes at step S93), the process goes on to step S94. Otherwise (no at step S93), the process goes on to step S97.

At step S94, the cache control unit 42 produces as many zero data blocks as the number of LBAs specified by the READ command. Then, the cache control unit 42 transmits the produced zero data blocks to the host device 30. Then, the process goes on to step S98.

At step S95, the cache control unit 42 reads the data block from the LBA of the LUN belonging to the RAID group 21 indicated by the LBA and LUN specified by the READ command. The read data block is taken as a read-requested data block. Then, the cache control unit 42 writes the read data block to the cache page 104a. Then, the process goes on to step S97.

At step S96, the cache control unit 42 reads the data block, which was written to the cache page LBA at step S60 of FIG. 12, from the cache page 104a. Then, the cache control unit 42 produces as many copies of the read data block as the number of LBAs specified by the READ command. These data blocks are taken as read-requested data blocks. Then, the process goes on to step S97.

At step S97, the cache control unit 42 transmits the read-requested data block(s) to the host device 30. Then, the process goes on to step S98.

At step S98, the cache control unit 42 sends the host device 30 a completion notice of the data transmission. Then, the process of FIG. 15 is terminated.

The storage system according to this third embodiment provides the same effects as that according to the second embodiment.

Further, according to the storage system of the third embodiment, the management table 42b needs less capacity than the management table 42a, thus making it possible to reduce an influence on the memory area of the cache memory 104.

The above processing functions can be realized by a computer. In this case, a program is prepared, which describes the processing contents of the functions of the control apparatus 3 and control modules 10a and 10b. The above processing functions are realized on the computer by executing the program. The program describing the needed processes may be recorded on a computer-readable recording medium. Computer-readable recording media include magnetic recording devices, optical discs, magneto-optical recording media, semiconductor memories, etc. The magnetic recording devices include hard disk drives, Flexible Disks (FD), magnetic tapes, etc. The optical discs include DVDs, DVD-RAMS, CD-ROM/RWs, etc. The magneto-optical recording media include Magneto-Optical disks (MO), etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the above program stores in its local storage device the program recorded on a portable recording medium or transferred from the server computer, for example. Then, the computer reads the program from the local storage device, and runs the program. The computer may run the program directly from the portable recording medium. Also, while receiving the program being transferred from the server computer, the computer may sequentially run this program.

Further, at least some of the above processing functions may be realized by electronic circuits such as Digital Signal Processor (DSP), Application Specific Integrated Circuit (ASIC), Programmable Logic Device (PLD), etc.

The disclosed technique makes it possible to reduce the time to give a response to a host device in response to a write request from the host device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A control apparatus for controlling data access to a storage medium, the control apparatus comprising:
    a memory configured to store zero data identification information and a bitmap including a plurality of bits corresponding to different blocks in the storage medium, the memory further providing a cache area to temporarily store data to be written to specified blocks in the storage medium; and
    one or more processors configured to perform a procedure comprising:
        receiving a write request from an access requesting apparatus,
        setting, when the received write request specifies a data block to be written a number of times to a series of blocks in the storage medium, a series of bits in the bitmap to indicate which blocks in the storage medium the specified data block is to be written,
        determining whether the specified data block is a zero data block containing only zeros or a non-zero data block containing non-zero data,
        setting, when the data block in the write request is determined to be a zero data block, the zero data identification information in the memory to indicate that the data block in the write request is a zero data block, and sending the access requesting apparatus a completion notice of the write request upon completion of the setting of the zero data identification information, and
        writing, when the specified data block in the write request is determined to be a non-zero data block, the specified data block to one block of the cache area which corresponds to a topmost one of the series of bits being set in the bitmap, and sending the access requesting apparatus a completion notice of the write request upon completion of the writing the specified data block to the one block of the cache area.

2. The control apparatus according to claim 1, wherein the procedure further comprises, when determining that the zero data identification information is set in the memory after sending the completion notice to the access requesting apparatus, writing the specified data block to the storage medium with reference to the series of bits being set in the bitmap in the memory.

3. The control apparatus according to claim 1, wherein the procedure further comprises, when determining that the zero data identification information is not set in the memory after sending the completion notice to the access requesting apparatus, producing copies of the specified data block within the cache area, with reference to the series of bits being set in the bitmap, and writing the copies of the data block from the cache area to the storage medium.

4. The control apparatus according to claim 1, wherein the procedure further comprises, upon receipt of a read request from the access requesting apparatus for reading data blocks in the storage medium, referring to the memory, and when determining that the zero data identification information is set, producing as many copies of a zero data block containing only zero data as requested, and transmitting the copies of the zero data block to the access requesting apparatus.

5. The control apparatus according to claim 4, wherein the procedure further comprises determining whether the zero data identification information is set or not, when the series of bits being set in the bitmap include bits corresponding to the data blocks requested by the read request.

6. The control apparatus according to claim 1, wherein the procedure further comprises, upon receipt of a read request from the access requesting apparatus for reading data blocks, referring to the memory, and when determining that the zero data identification information is not set, producing copies of the data block stored in the one block of the cache area which corresponds to the topmost one of the series of bits being set in the bitmap, and transmitting the copies of the data block to the access requesting apparatus.

7. The control apparatus according to claim 1, wherein the procedure further comprises:
    receiving another write request from the access requesting apparatus for writing a zero data block a specified number of times to another series of blocks in the storage medium
    merging another series of bits corresponding to said another series of blocks into the existing series of bits being set in the bitmap, and
    sending the access requesting apparatus a completion notice of said another write request upon completion of the merging.

8. The control apparatus according to claim 1, wherein the procedure further comprises:
    receiving another write request from the access requesting apparatus for writing a non-zero data block a specified number of times to another series of blocks in the storage medium,
    copying the data block stored in the one block of the cache area to other blocks in the cache area which correspond to the series of bits being set in the bitmap, and
    updating the bitmap in the memory with said another data block received from the access requesting apparatus.

9. A control method for controlling data access to a storage medium, the control method comprising:
    producing, by a computer, a bitmap in a memory of the computer, the bitmap including a plurality of bits corresponding to different blocks in the storage medium;
    receiving, by the computer, a write request from an access requesting apparatus;
    setting, by the computer when the received write request specifies a data block to be written a number of times to a series of blocks in the storage medium, a series of bits in the bitmap to indicate which blocks in the storage medium the specified data block is to be written;
    determining, by the computer, whether the specified data block is a zero data block containing only zeros or a non-zero data block containing non-zero data;
    setting, by the computer, when the data block is determined to be a zero data block, zero data identification information in the memory to indicate that the data block in the write request is a zero data block, and sending the access requesting apparatus a completion notice of the write request upon completion of the setting of the zero data identification information; and
    writing, when the specified data block in the write request is determined to be a non-zero data block, the specified data block to one block of the cache area which corresponds to a topmost one of the series of bits being set in the bitmap, and sending the access requesting apparatus a completion notice of the write request upon completion of the writing the specified data block to the one block of the cache area.

10. A storage apparatus comprising:

a storage medium; and a control apparatus that controls data access to the storage medium, wherein the control apparatus includes:

a memory configured to store zero data identification information and a bitmap including a plurality of bits corresponding to different blocks in the storage medium, the memory further providing a cache area to temporarily store data to be written to specified blocks in the storage medium, and one or more processors configured to perform a procedure comprising:

receiving a write request from an access requesting apparatus, setting, when the received write request specifies a data block to be written a number of times to a series of blocks in the storage medium, a series of bits in the bitmap to indicate which blocks in the storage medium the specified data block is to be written, determining whether the specified data block is a zero data block containing only zeros or a non-zero data block containing non-zero data, setting, when the data block in the write request is determined to be a zero data block, the zero data identification information in the memory to indicate that the data block in the write request is a zero data block, and sending the access requesting apparatus a completion notice of the write request upon completion of the setting of the zero data identification information, and writing, when the specified data block in the write request is determined to be a non-zero data block, the specified data block to one block of the cache area which corresponds to a topmost one of the series of bits being set in the bitmap, and sending the access requesting apparatus a completion notice of the write request upon completion of the writing the specified data block to the one block of the cache area.

* * * * *